United States Patent [19]

Mavros

[11] Patent Number: 4,698,078
[45] Date of Patent: Oct. 6, 1987

[54] SEPARATOR ASSEMBLY

[75] Inventor: Stratos Mavros, Franklin Lakes, N.J.

[73] Assignee: Parmatic Filter Corporation, Wayne, N.J.

[21] Appl. No.: 906,552

[22] Filed: Sep. 4, 1986

Related U.S. Application Data

[63] Continuation of Ser. No. 783,037, Oct. 2, 1985, abandoned.

[51] Int. Cl.⁴ .................... B01D 46/46; B01D 50/00
[52] U.S. Cl. ...................................... 55/213; 55/313; 55/422; 55/493
[58] Field of Search .................. 55/309, 312–314, 55/422, 478–481, 493, 213

[56] References Cited

U.S. PATENT DOCUMENTS

| | | | |
|---|---|---|---|
| 1,914,667 | 6/1933 | Kolla | 55/313 X |
| 2,135,750 | 11/1938 | Harding | 55/493 X |
| 2,303,333 | 12/1942 | Dauphinee | 55/312 |
| 2,783,786 | 3/1957 | Carter | 55/309 X |
| 3,353,551 | 11/1967 | Smale | 55/312 X |
| 3,410,288 | 11/1968 | Hajek | 55/312 X |
| 3,411,272 | 11/1968 | Carmon | 55/313 X |
| 3,421,296 | 1/1969 | Beurer, Sr. | 55/314 X |
| 3,593,503 | 7/1971 | Andrews | 55/493 X |
| 3,612,024 | 10/1971 | Bandimere | 55/312 X |
| 3,733,814 | 5/1973 | Hull, Jr. et al. | 55/422 X |
| 3,823,532 | 7/1974 | Cooper et al. | 55/422 X |
| 4,081,255 | 3/1978 | Evans | 55/309 X |
| 4,231,769 | 11/1980 | Ahlrich | 55/493 X |
| 4,312,645 | 1/1982 | Mavros et al. | 55/213 |
| 4,361,423 | 11/1982 | Nitz | 55/309 X |

FOREIGN PATENT DOCUMENTS 433056  6/1923  Fed. Rep. of Germany ........ 55/313

Primary Examiner—Robert Spitzer
Attorney, Agent, or Firm—Murray and Whisenhunt

[57] ABSTRACT

Separator assembly for an air duct, particularly but not exclusively an air intake duct of a turbine device, for removing particulate matter entrained in air passing through the air duct. The separator assembly comprises a separator for removing particulate matter entrained in air passing through the separator, and a mounting member for mounting the separator relative to the air duct so that the separator is moveable between a first position in which the separator is arranged so that air passing through the air duct passes through the separator, and a second position in which the separator is arranged so that air passing through the air duct bypasses the separator. A holding and power applying device is provided for holding the separator in the first position and for applying power to the separator to force the separator to move from the first position to the second position.

55 Claims, 47 Drawing Figures

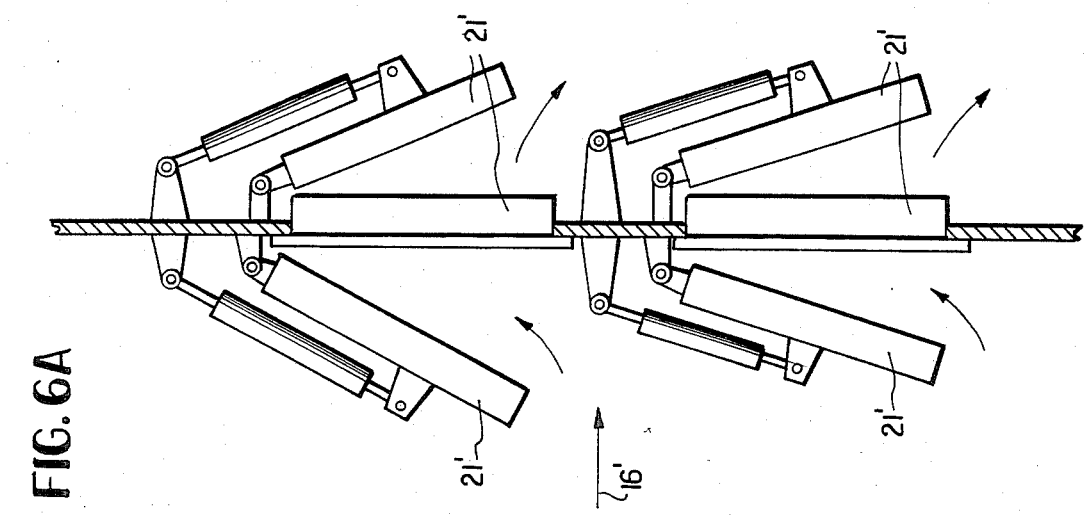
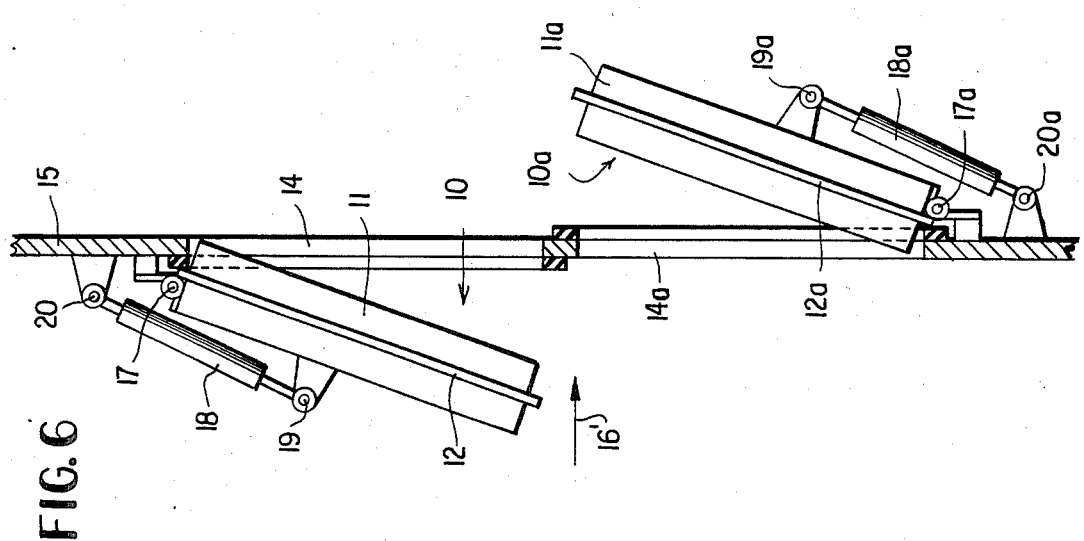
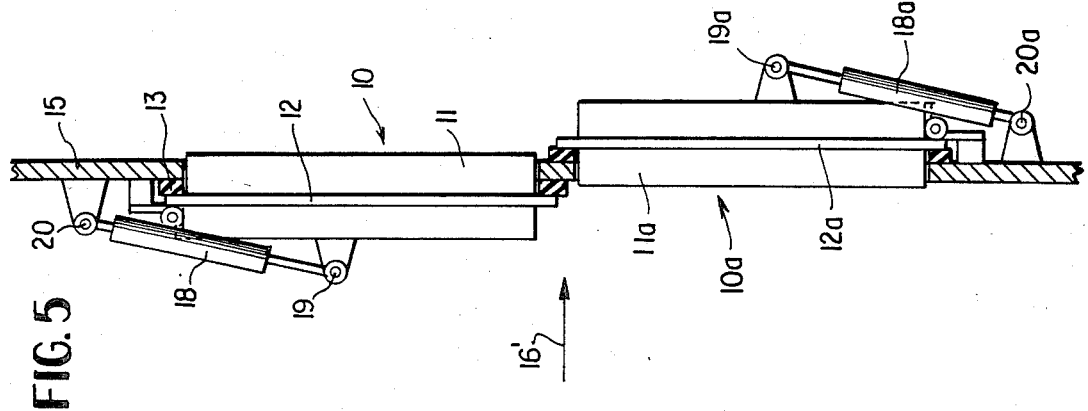

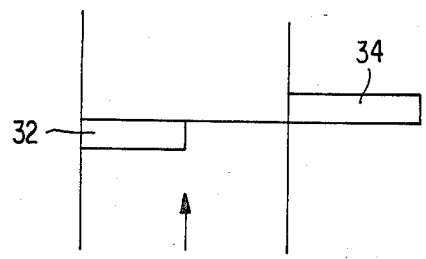
FIG. 7h
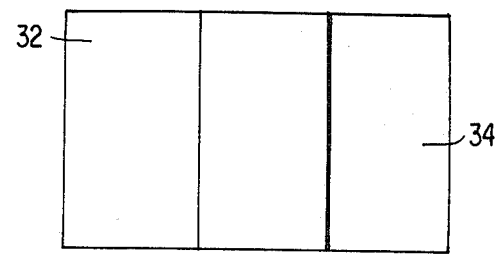
FIG. 7i
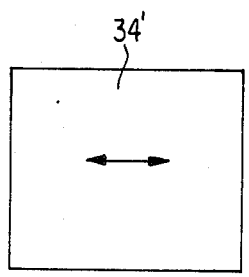
FIG. 7j
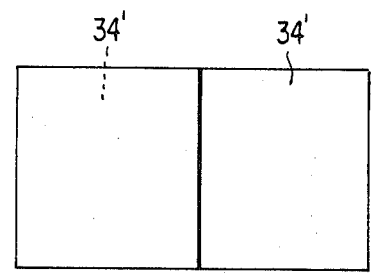
FIG. 7k
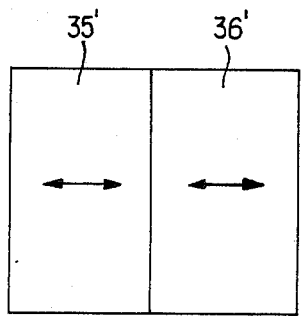
FIG. 7l
FIG. 7m
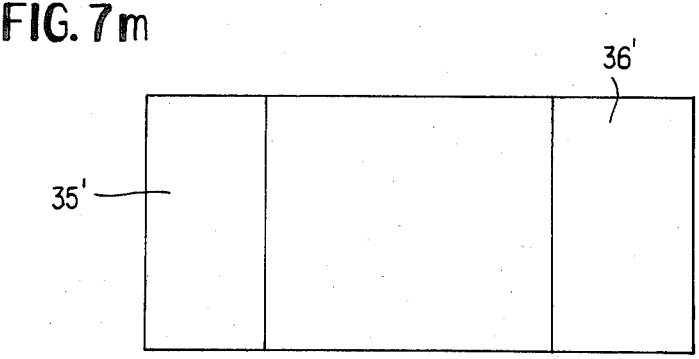

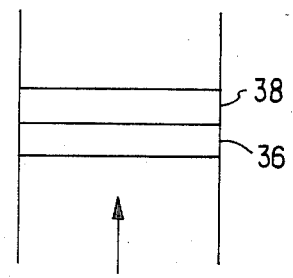
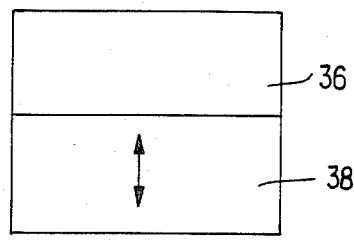
FIG. 8a    FIG. 8b
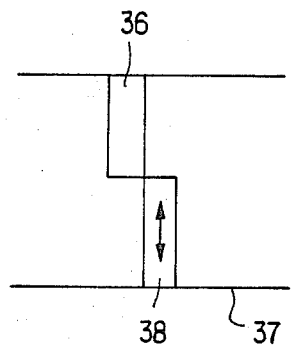
FIG. 8c
FIG. 8d    FIG. 8e
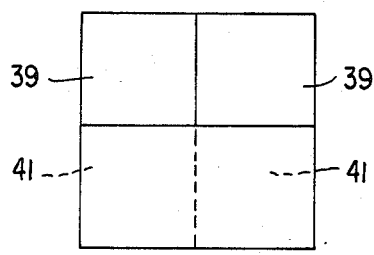
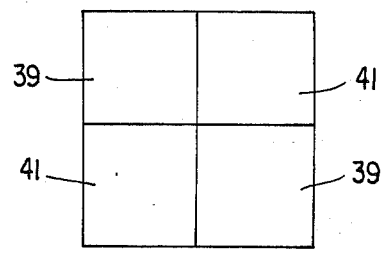
FIG. 8f    FIG. 8g
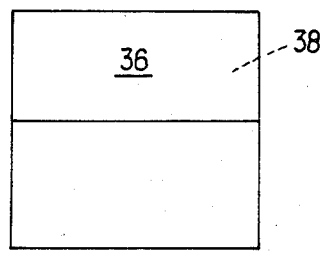
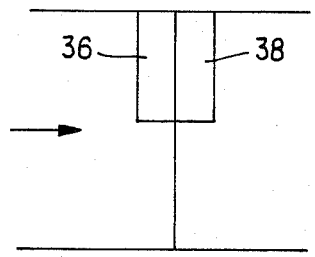

FIG. 9a
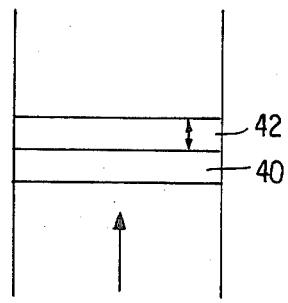
FIG. 9b
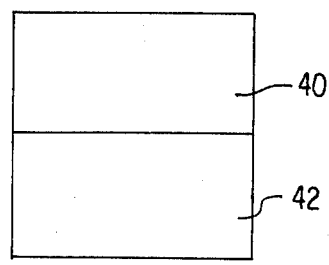
FIG. 9c
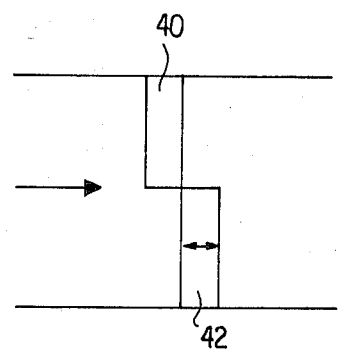
FIG. 9d
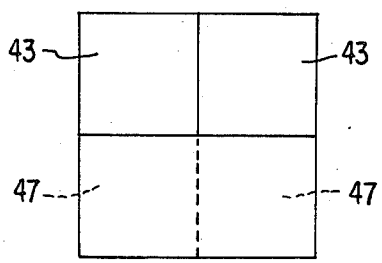
FIG. 9e
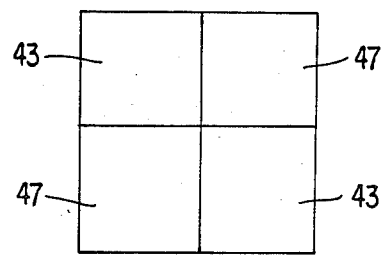
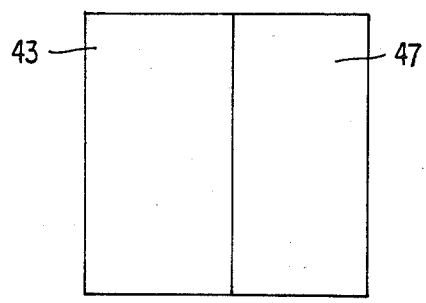
FIG. 9f

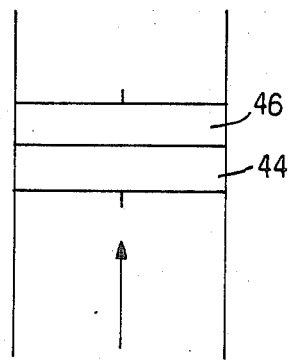
FIG. 10a
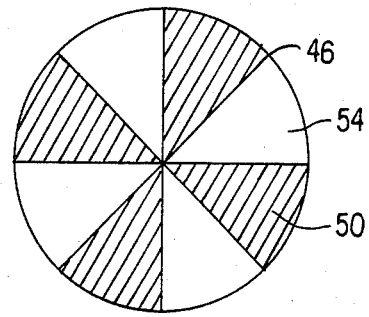
FIG. 10b
FIG. 10c
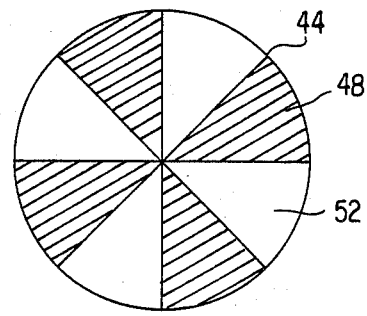
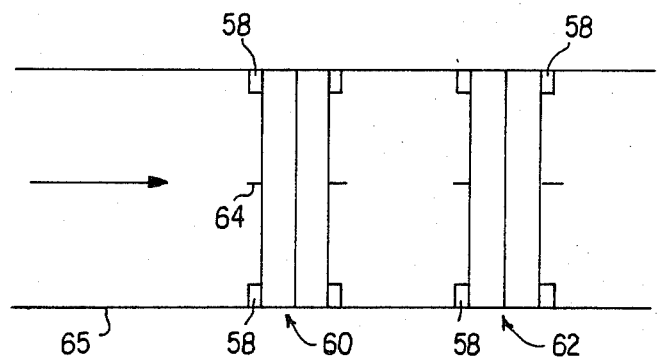
FIG. 10d

SEPARATOR ASSEMBLY

This application is a continuation of Ser. No. 783,037, filed Oct. 2, 1985, now abandoned.

The present invention relates to a separator assembly, and more particularly, but not exclusively, to a separator assembly for a gas turbine for marine applications. For example, the separator assembly of the present invention is particularly useful as a moisture and/or particle separator for removing moisture and/or particulate matter entrained in the air entering the air intake of a gas turbine of a ship.

BACKGROUND OF THE INVENTION

Moisture separators are provided for gas turbines for marine applications as the moisture particles in the air generally contain salt which, if they should be introduced into the turbine, would deleteriously affect the component parts of the turbine, as for example, by chemical corrosion. Further, the dry particles entrained in the air, for example, sand and/or salt crystals, can cause "pitting" of the turbine components if they are not removed. However, by far the greatest concern is the moisture particles containing salt.

Although various types of separator assemblies have been proposed for use in marine applications to minimize the passage of air containing such particles to the turbine, it will also be understood that of an even greater importance is the provision of a substantial air flow being maintained to the turbine. In fact, this is of such importance that it is deemed imperative that air always be delivered to the turbine, even if it means delivering air which might otherwise damage the turbine components, i.e., air having moisture and/or salt therein.

Accordingly, in the past, doors or passageways, known as "Blow in" doors, have been provided in the air ducts adjacent to the moisture separators which are automatically opened if the pressure drop across the moisture separator increases too much, i.e., beyond a predetermined limit which might otherwise result in the turbine being starved of air flow. In accordance with these prior art arrangements, unfiltered air is thus allowed to flow into the air duct, bypassing the moisture separator, to be delivered to the turbine.

Such an increase in the pressure drop across the moisture separator can result from freezing or icing up of the moisture separators when the ships on which they are mounted are in cold or icy waters since the moisture separators for the gas turbines on such ships are generally located high up on the ship where they are unprotected from the elements. For example, the moisture that is removed from the air by the moisture separator can freeze in the moisture separator, thereby significantly blocking the flow of air through the separator which, in turn, causes the pressure drop across the moisture separator to increase, and a consequent decrease in the amount of air being delivered to the turbine.

Our U.S. Pat. No. 4,312,645 describes a simplified separator assembly for an air intake duct of a turbine device for normally removing particulate matter entrained in air being introduced into the turbine device, the air being introduced to flow through the air duct in a first direction. The separator assembly comprises separating means for removing particulate matter entrained in air passing therethrough; frame means for supporting the separating means; pivotal mounting means for pivotably mounting the frame means in the air duct so as to pivot about an axis extending in a second direction which is transverse to the first direction, and so that the frame means when mounted in the air duct is pivotably movable between a first position in which the separating means, and a second position in which the air duct bypasses the separating means; sensing means for sensing the pressure differential of the air across the separating means; and clamping means for normally clamping the frame means in the first position when the frame means is mounted in the air duct, said clamping means being operatively connected to the sensing means so that the clamping means is responsive to the sensing means sensing a pressure differential greater than a predetermined pressure difference to release the frame means from the first position so that the air flowing into the air duct causes the frame means to pivot about the axis toward the second position. In this way, air flow will be maintained to the turbine device. Thus, in the separator assembly of that U.S. patent, the separating means is opened in the direction of air flow by the pressure of the air.

It is an object of the present invention to provide other forms of separator assembly which allow air to bypass the separating means when necessary.

SUMMARY OF THE INVENTION

According to one aspect, the present invention provides a separator assembly for an air duct (particularly but not exclusively an air intake duct of a turbine device) for normally removing particulate matter entrained in air passing through the air duct, the air being introduced to flow through the air duct in a first direction. The present invention may be multi-staged and may apply to any separator assembly design utilized for the protection of gas turbines in marine applications. In operation, in addition to providing filtration of moisture and particulate matter as previously described, the present invention protects against the ingress of foreign bodies (e.g. bolts, broken machine parts, and similar objects) and ice into the engine. The separator assembly comprises separating means for removing particulate matter entrained in air passing therethrough, means mounting the separating means relative to said air duct so as to be movable between a first position in which the separating means is arranged so that air passing through the air duct passes through the separating means and a second position in which the separating means is arranged so that air passing through the air duct bypasses the separating means, and means for holding the separating means in the first position and for applying power other than that of the air flow to the separating means to force the separating means to move in any of several directions from the first position to the second position.

Preferably, the power-applying means also constitute the holding means, although if desired separate power-applying means and holding means may be provided.

The power-applying means are preferably also operable to move the separating means from the second position to the first position.

The power-applying means may comprise at least one pneumatic, hydraulic or electric actuator or a manually-powered actuator, or any combination of such actuators. For example, a pneumatic, hydraulic or electric actuator or actuators may be provided to move the separating means from one of the positions to the other and a manually-powered actuator or actuators may be provided to move the separating means in the reverse direction.

The mounting means may be a pivotal mounting means, e.g., as described in U.S. Pat. No. 4,312,645. Thus, the separating means may be rectangular and hinged or pivoted at one boundary surface or pivoted at opposite positions on opposite boundary surfaces intermediate the ends thereof.

Alternatively, the mounting means may be such that the separating means moves either axially, horizontally, vertically or rotationally between the first and second positions. Each of these possibilities is described in more detail below.

For axial movement, the separating means may be carried on tracks (e.g., rods or rack and pinion) extending parallel to the direction of the air flow. When the separating means is mounted for axial movement, the power-applying means may move the separating means axially from its first to its second position in the opposite direction to the first direction (i.e., against the air flow). Alternatively, the power-applying means may be arranged to move the separating means axially from its first to its second position in the same direction as the air flow (i.e., in the first direction).

For horizontal movement, the separating means may be carried on tracks, (e.g., rods or rack and pinion) extending horizontally transverse to the direction of the air flow. When the separating means is mounted for horizontal movement, the power-applying means may move the separating means from its first to its second position horizontally transverse to the direction of the air flow. The power-applying means may also move the separating means from its second position to its first position horizontally transverse to the direction of air flow, although this could be achieved, if desired, by utilizing alternative power applying means such as, for example, a manually powered actuator.

For vertical movement, the separating means may be carried on tracks, (e.g., rods or rack and pinion) extending vertically transverse to the direction of the air flow. When the separating means is mounted for vertical movement, the power-applying means may move the separating means from its first to its second position vertically transverse to the direction of the air flow. The power-applying means may also move the separating means from its second position to its first position vertically transverse to the direction of the air flow although, as with the horizontal movement embodiment described earlier, this could be achieved, if desired, by utilizing alternative power-applying means such as, for example, a manually powered actuator.

For rotational movement, the separating means is not rectangular or square in cross-section but has a circular cross-section and may be carried on dual wheel frame means. The frame means may include the separating means as sectors of a circle mounted alternatively with open sectors of a circle having no separating means, in dual frames mounted axially and parallel, one behind the other such that the two wheel frame means may be rotated independently of each other transverse to the direction of the air flow, clockwise or counter-clockwise. When the separating means is mounted for rotational movement, the power-applying means moves the separating means rotationally on the axis of the wheel frame means from its first position to its second position rotationally transverse to the direction of the air flow, in either clockwise or counter-clockwise direction. The power-applying means may also move the separating means from its second position to its first position rotationally transverse to the direction of the air flow in either clockwise or counter-clockwise direction. Alternatively, the rotation from the second position to the first position may be achieved utilizing other power-applying means such as, for example, a manually powered actuator. In the normal closed position, i.e. the first position, the separating means mounted in the two dual wheel frame means are not axially aligned so that the sectors containing the separating means present a continuous separating means such that the air passing through the air duct passes through the separating means. The power-applying means may move one or both of the dual wheel frame means with the integrally included sectored separating means from its first to its second position rotationally transverse to the direction of the air flow, clockwise or counter-clockwise, and in the return direction, if desired, such that in the second position the sectored separating means of the one dual wheel frame means are physically located directly behind the sectored separating means of the second dual wheel frame means, such that there is a free passage of air flow through the exposed open sectors of both dual wheel frame means.

In a second form of rotational movement, the separating means mounted in a frame means may be of any required shape in cross-section to match the cross-section of the air intake air duct. In the normal closed position, i.e., the first position, the separating means is located in the air intake air duct so that the separating means presents a continuous separating means such that the air passing through the air intake air duct passes through the separating means. The power applying means moves the separating means rotationally on an axis located on the perimeter of the air duct and extending parallel to the direction of the air flow, from its first position to its second position rotationally transverse to the direction of the air flow, in either a clockwise or counter-clockwise direction. The power applying means may also move the separating means from its second position to its first position rotationally transverse to the direction of the air flow in either a clockwise or counterclockwise direction. Alternatively, the rotation from the second position to the first position may be achieved utilizing the other power applying means such as, for example, a manually powered actuator.

In all of the embodiments of the invention, the arrangement may be such that substantially all of the air passing through the air duct passes through said separating means. However, if desired, a further separating means may be provided operating in parallel with the first-mentioned separating means. In that case, the arrangement is such that substantially all of the air passing through the air duct passes through the first and further separating means. The further separating means will have mounting means and holding means as aforesaid, and means may be provided for applying power other than that of the air flow to the further separating means to force the further separating means to move in the first direction (i.e., in the direction of the air flow) from its first position to its second position and in the reverse direction from its second position to its first position. If desired, a plurality of first and/or further separating means may be provided.

The separating means or each separating means is preferably supported in a frame by which it is mounted as aforesaid.

Usually, sensing means will be provided for sensing the pressure differential of the air across the separating means, the holding and power-applying means being operatively connected to the sensing means so that the holding and power-applying means are responsive to the sensing means sensing a pressure differential greater than a predetermined pressure difference to cause the movement of the separating means from its position to its second position. Where a manually-powered actuator is provided, the sensing means may additionally or alternatively be arranged to provide a visible and/or audible signal to the operator.

Where appropriate, features of construction or operation described in U.S. Pat. No. 4,312,645 may be used in carrying the present invention into effect. In light of this, the entire disclosure of U.S. Pat. No. 4,312,645 is hereby incorporated by reference into the present case.

BRIEF DESCRIPTION OF THE DRAWINGS

Embodiments of the present invention will now be described by way of example with reference to the accompanying drawings, in which:

FIG. 5 is a side view of a further embodiment of a separator assembly in its closed position;

FIG. 6 is a side view of an alternative embodiment of the separator assembly of FIG. 5 in its open position;

FIG. 6a is a side view of another embodiment of the separator assembly of FIG. 5 in one of its open positions;

FIGS. 7a through 7m are schematic representations of an alternative embodiment of a separator assembly of the invention;

FIGS. 8a through 8m are schematic representations of another embodiment of a separator assembly of the present invention;

FIGS. 9a through 9f are schematic representations of a further embodiment of a separator assembly of the invention;

FIGS. 10a, 10b, 10c, and 10d are schematic representations of a yet further embodiment of a separator assembly of the invention.

DETAILED DESCRIPTION OF THE INVENTION

Figure 1:
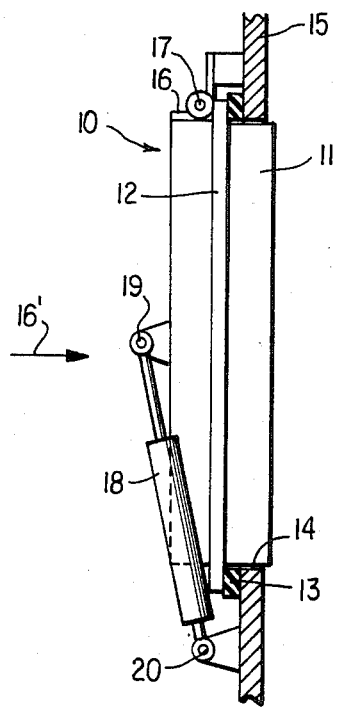
FIG. 1 is a side view of one embodiment of a separator assembly in its first (closed) position.

In all of the illustrated and described embodiments, a separating means (10) is supported in a frame (11) with a peripheral sealing flange (12). The flange (12) can be seated against a gasket (13) round an opening (14) in a mounting member (15) in the form of a plate at the inlet entrance of an air inlet duct of a gas turbine (not shown). The direction of the air stream is indicated by an arrow (16').

Figure 2:
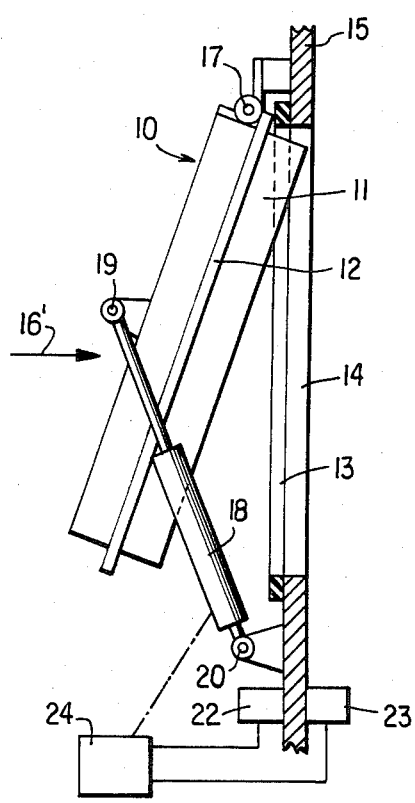
FIG. 2 is a side view of the separator assembly of FIG. 1 in its second (open) position.

In FIGS. 1 and 2, a frame (11) is pivoted to a mounting member (15) about an axis extending in a direction transverse to the direction of air flow by hinges (17) on an upper boundary surface (16) so that the frame can be swung from the closed position of FIG. 1 to the open position of FIG. 2. Alternatively, the hinges might be provided along a lower boundary surface or one of the side boundary surfaces of the frame. An actuator (18) (which may be pneumatic, hydraulic, electric or manually operated), or more than one actuator, is pivotably connected at its ends between supports (19), (20), on the frame (11) and mounting member (15), respectively, so that operation of the actuator(s) in one direction forces the separating means (10) to move against the air flow from the closed position of FIG. 1 to the open position of FIG. 2. Operation of the actuator(s) in the opposite direction forces the separating means to move from the open position to the closed position. The actuator(s) provides both a limit stop and the force necessary to maintain the separating means in the open position and a constant retention force to maintain the sealing flange (12) in sealing engagement with the gasket (13) in the closed position. The actuator(s) may, if desired, be disposed in different positions from those shown in the drawings. If desired, provision may be made for pneumatic, hydraulic or electric power movement of the separating means in one direction and manual power movement in the other direction or for the manual movement in both directions. Various different linkage mechanisms, such as four bar, parallel link, ball nut and screw and the like may be used to transmit operating power to the frame.

Figure 3:
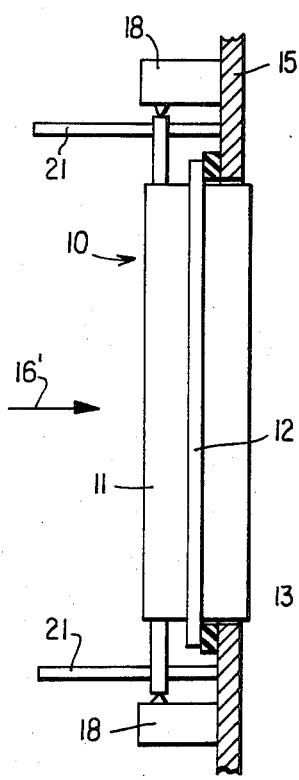
FIG. 3 is a side view of another embodiment of a separator assembly in its closed position.
Figure 4:
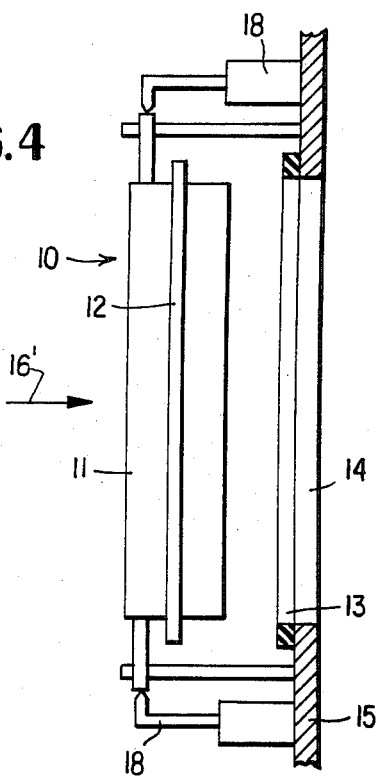
FIG. 4 is a side view of the separator assembly of FIG. 3 in its open position.

The embodiment of FIGS. 3 and 4 is constructed and operates in the same way as the assembly of FIGS. 1 and 2, except that the frame (11) is not pivotably mounted but is slidably mounted on parallel rods (21) extending at right angles to the mounting member (15). Parallel rods may be provided at one or more of the boundary surfaces of the frame (11), depending on size and conditions. In FIGS. 3 and 4, rods (21) are provided at two opposite boundary surfaces. Bearings or other low friction devices are provided on the frame to minimize friction with the rods. In this embodiment, pivotal connection of the actuator(s) to the frame and mounting member is, of course, not necessary. If desired, this embodiment may be modified so that movement of the separating means into the open position is in the same direction as the air flow.

In the embodiment of FIGS. 5 and 6, a first separating member (10) is provided mounted and operated as in the embodiment of FIGS. 1 and 2, except that each actuator (18) extends downwardly of upwardly from support (20) on the mounting member (15) to support (19) on the frame. A second separating member (10a) is supported in a frame (11a) pivoted at its lower boundary surface by hinges (17a) to mounting member (15). The second separating member (10a), which is disposed below separating member (10) and associated with an opening (14a) below opening (14), is operated by actuator(s) (18a) by which it can be moved between closed and open positions. Movement of the frame (11a) into the open position is in the same direction as the air flow. The two separating means may be moved simultaneously, separately, or one separating means may move while the second separating means may remain fixed.

Alternatively, and with specific reference to FIGS. 1 through 4, separating means (10) supported in frames (11), may move from the first (closed) position to the second (open) position, either with the air flow or against the air flow.

With specific reference to FIGS. 5 and 6, separating members (10) and (10a) supported in frames (11) and (11a), respectively, may move from the first (closed)

position to the second (open) position, either with the air flow or against the air flow, and may move simultaneously or separately, such that:

(a) Both frames move in the same direction with the air flow;
(b) Both frames move in the same direction against the air flow;
(c) Frame (11) moves in the direction with the air flow and frame (11a) moves in the direction against the air flow;
(d) Frame (11) moves in the direction against the air flow and frame (11a) moves in the direction with the air flow;
(e) Frame (11) remains fixed and frame (11a) moves in the direction against the air flow;
(f) Frame (11) remains fixed and frame (11a) moves in the direction with the air flow;
(g) Frame (11) moves in the direction against the air flow and frame (11a) remains fixed; and
(h) Frame (11) moves in the direction with the air flow frame (11a) remains fixed.

With reference to FIGS. 5 and 6, the separating members (10) and (10a) supported in frames (11) and (11a) may be located, optionally, in the same plane of the separator assembly, in a parallel plane of the separator assembly, or in a series of two or more parallel planes of the separator assembly, with each of the separating members (10) and (10a) arranged to move either as a complete assembly within the frames (11) and (11a) or in a split configuration where part of each separating member moves and part of each separating member remains fixed.

With further reference to FIG. 6a, separating members (10) and (10a) may consist of two or more stages (21') supported in frames (11) and (11a), respectively. In operation, the first stage only of separating members (10) and (10a) may move from the first (closed) position to the second (open) position against the air flow. Additionally, the last stage only of separating members (10) and (10a) may move from the first (closed) position to the second (open) position with the air flow. Movement of the first stage against the air flow may be independent of movement of the last stage with the air flow, or both first and last stages of the separating members (10) and (10a) may move simultaneously. Optionally, the first stage, intermediate stage(s), if present, or the last stage, may be fixed while the remaining stage or stages may move, as previously described.

In further reference to FIGS. 5 and 6, each of the described separating members (10) and (10a) supported in frames (11) and (11a), respectively, may be pivoted to the mounting member (15) about an axis extending in a direction transverse to the direction of the air flow by hinges (17) and (17a) on any boundary surface such that the separating member(s) may be swung from the first (closed) position of FIG. 5 to the second (open) position of FIG. 6. Alternatively, the hinges might be provided along the upper boundary surface, the lower boundary surface, either of the side boundary surfaces, or one or more of the aforesaid boundary surfaces of the frame.

Figure 7A:
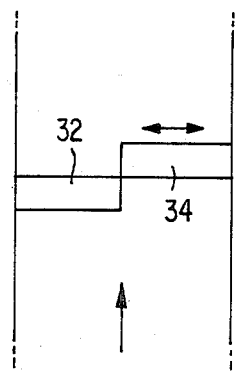
Figure 7B:
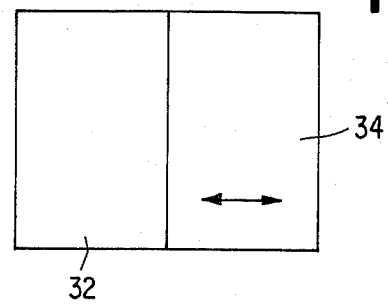
Figure 7C:
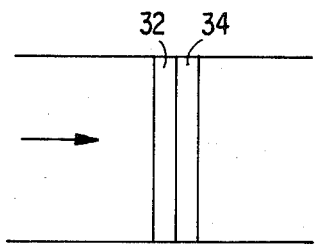

FIGS. 7a, 7b and 7c, are schematic top, front and side views of an embodiment of a separator assembly in its first (closed) position, with one fixed separator means (32) and one additional separator means (34) arranged for horizontal translation. In operation, the moveable separator means (34) moves to its second (open) position, either behind the fixed separator means (32) as shown in FIGS. 7f and 7g or into the wall of the air intake air duct, as shown in FIGS. 7h and 7i. In either the open or closed position, the separator assembly is horizontally transverse with respect to the direction of the air flow.

The fixed separator means (32) may be located, either as shown in FIGS. 7a, 7b and 7c, or may be opposite handed, with the fixed separator means mounted on the right as viewed in FIG. 7a. In addition, the moveable separator means (34) may be located either before or after the fixed separator means, relative to the air flow.

Figure 7D:
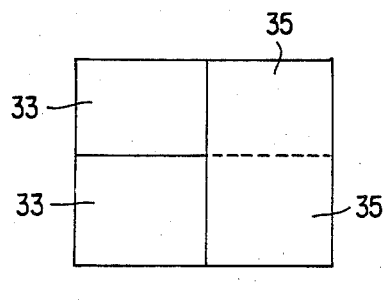
Figure 7E:
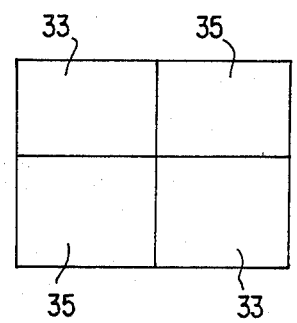
Figure 7F:
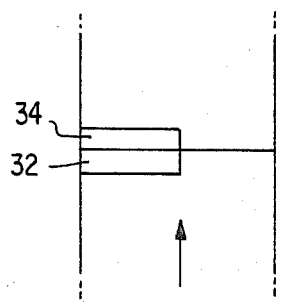
Figure 7G:
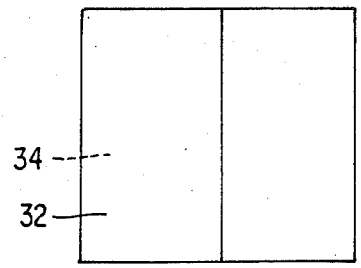

Referring to FIGS. 7d and 7e, the fixed separator means (32) may optionally consist of one or more separator assemblies (33), located in left-handed (FIG. 7d), right-handed (FIG. 7d in dotted outline) or left to right diagonally arranged or right to left diagonally arranged (FIG. 7e) configurations arranged with movable separator means (35) of equal number, all collectively arranged horizontally transverse to the direction of the air flow.

FIGS. 7j through 7m show variations of the embodiment illustrated in FIG. 7b. In FIG. 7j, there is no fixed moisture separator, and one moveable moisture separator (34') is provided which moves between its first position (closed) as shown in FIG. 7j and its open position as shown in FIG. 7k. It will be appreciated that the moveable moisture separator (34') can move either to its left or its right into the air duct wall. In the variation shown in FIG. 7l, there is, again, no fixed moisture separator, but instead two moveable moisture separators (35', 36') are provided in the duct which can each move left or right into the air duct wall, as shown in FIG. 7m. A yet further possible variation is similar to that shown in FIGS. 7d and 7e, but with additional moisture separator means arranged in left-handed or right-handed configurations, or arranged left to right diagonally or right to left diagonally, and configured to permit all moisture separators to move separately or collectively.

Figure 8H:
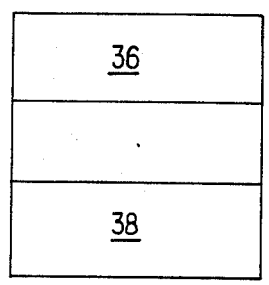
Figure 8I:
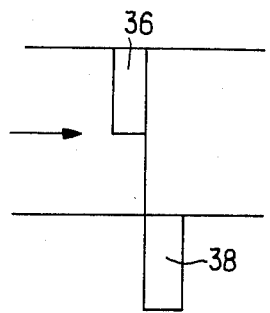

FIGS. 8a, 8b and 8c are schematic top, front and side views of another embodiment of a separator assembly in its first (closed) position, with one fixed separator means (36) and one additional separator means (38) arranged for vertical translation. In operation, the movable separator means (38) moves to its second (open) position, either as shown in FIGS. 8f and 8g or into the wall of the air intake air duct, as shown in FIGS. 8h and 8i. In either position, the separator assembly would be vertically transverse with respect to the direction of the air flow.

The fixed separator means (36) may be located, either as shown in FIGS. 8a, 8b and 8c, or may be opposite handed, with the positions of fixed separator means and the movable separator means as viewed in FIG. 8c interchanged so that the fixed separator means is upstanding from a lower duct surface (37). In addition, the moveable separator means (38) may be located either before or after the fixed separator means, relative to the air flow.

Referring to FIGS. 8d and 8e, the fixed separator means (36) may optionally consist of one or more separator assemblies (39), located in upper-handed (FIG. 8d), lower-handed (FIG. 8d in dotted line) or left to right diagonally arranged or right to left diagonally arranged (FIG. 8e) configurations, arranged with moveable separator means (41) of equal number, all collectively arranged vertically transverse to the direction of the air flow.

FIGS. 8j through 8m show variations of the embodiment illustrated in FIG. 8b. In the embodiment of FIG.

Figure 8J:
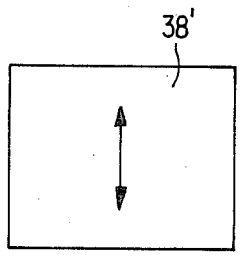
Figure 8K:
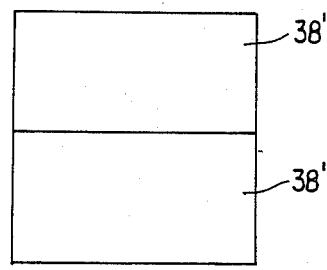
Figure 8L:
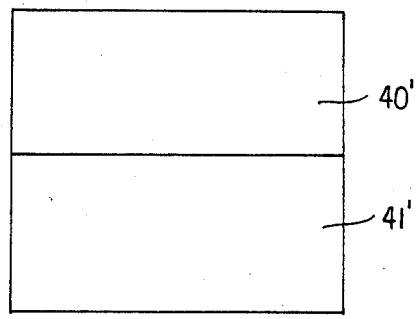
Figure 8M:
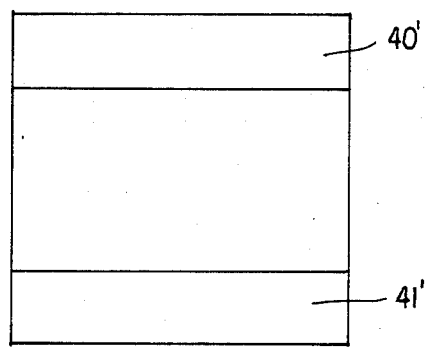
Figure 11A:
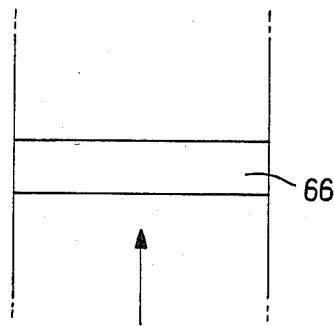
FIGS. 11a through 11d are schematic representations of alternate embodiments of a separator assembly of the present invention.
Figure 11B:
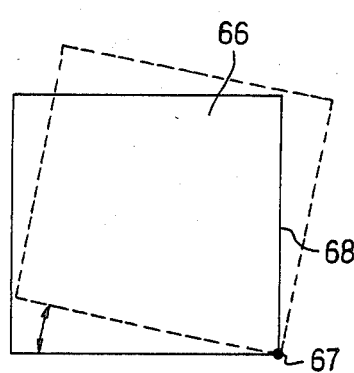
Figure 11C:
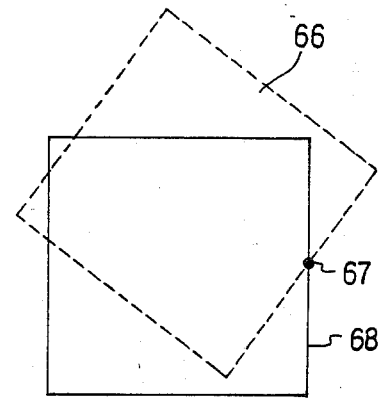
Figure 11D:
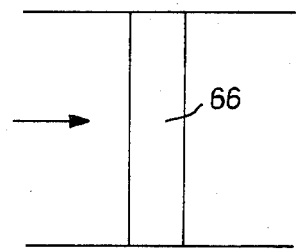

8*j*, there is no fixed moisture separator, and instead one movable moisture separator (38′) is shown which is moveable from its first closed position shown in FIG. 8*j* to its second open position shown in FIG. 8*k*. It will be appreciated that the moisture separator (38′) can move either up or down into the air duct wall. The embodiment illustrated in FIG. 8*l* again has no fixed moisture separator, but instead has two moveable moisture separators (40′ and 41′). The two moveable moisture separators (40′, 41′) are shown in their first closed position in FIG. 8*l*, and in their open position in FIG. 8*m*, where the moisture separators have moved upwardly and downwardly respectively into the air duct wall. A yet further possible variation is similar to the embodiment illustrated in FIGS. 8*d* and 8*e*, but with additional moisture separator means arranged in upper-handed or lower-handed configurations, or arranged left to right diagonally or right to left diagonally. In this possible variation, the moisture separator means are all arranged so that they may move separately or collectively.

FIGS. 9*a*, 9*b* and 9*c* are schematic top, front and side views of a further embodiment of a separator assembly in its first (closed) position, with one fixed separator means (40) and one additional separator means (42) arranged for axial translation. In operation, the moveable separator means (42) moves to the second (open) position extending parallel to the direction of the air flow, either with the air flow or against the air flow. In either position, the separator assembly is transverse to the direction of the air flow.

The fixed separator means may be located, either as shown in FIGS. 9*a*, 9*b* and 9*c*, or may be opposite handed, with the positions of the fixed separator means (40) and the moveable separator means (42) as viewed in FIG. 9*c* interchanged either in the vertical or the horizontal configuration, the moveable separator means (42) may be located either before or after the fixed separator means, relative to the air flow.

Optionally, referring to FIGS. 9*d*, 9*e* and 9*f*, the fixed separator means (40) may consist of one or more separator assemblies (43) located in any configuration, whether upper-handed (FIG. 9*d*), lower-handed (FIG. 9*d* in dotted line), left to right diagonally arranged or right to left diagonally arranged (FIG. 9*e*) or left-handed or right-handed (FIG. 9*f*) with moveable separator means of equal number, all collectively arranged transverse to the direction of the air flow and moveable either with the air flow or against the air flow.

FIGS. 10*a*, 10*b*, 10*c* and 10*d* are schematic top, front and side views of another embodiment of a separator assembly with two identical sectored wheels (44) (46) each having an equal number of separator sectors (48) (50) and an equal number of open sectors (52) (54) arranged for rotational translation. In the first (closed) position, the separator sectors (48) (50) in each wheel, are non-axially aligned such that the separator sectors (48) (50) collectively present a continuous circular separator assembly transverse to the direction of the air flow. In order to achieve the second (open) position, one or the other wheel (44) (46) or both rotate, either clockwise or counter-clockwise, placing the separator sectors (48) of the one wheel directly behind the separator sectors (50) of the second wheel, and leaving the intervening open sectors (52) (54) open to the free passage of air by-passing the separator sectors (48, 50).

Alternatively, the dual sectored wheels may be arranged in any one of the following arrangements:
(a) Wheel (44) fixed with wheel (46) rotating clockwise;
(b) Wheel (44) fixed with wheel (46) rotating counter-clockwise;
(c) Wheel (44) fixed with wheel (46) rotating clockwise or counter-clockwise;
(d) Wheel (44) rotating clockwise with wheel (46) rotating counter-clockwise;
(e) Wheel (44) rotating counter-clockwise with wheel (46) rotating clockwise;
(f) Wheel (46) fixed with wheel (44) rotating clockwise;
(g) Wheel (46) fixed with wheel (44) rotating counter-clockwise; and
(h) Wheel (46) fixed with wheel (44) rotating clockwise or counter-clockwise.

Optionally, as shown in FIG. 10*d* the sectored wheels with separator means may consist of two or more separator assemblies (60, 62), located axially in series, and having a common axis (64) parallel to the direction of the air flow.

With specific reference to FIGS. 10*a*, 10*b*, 10*c* and 10*d*, duct work (65) carrying the incoming air to the circular separator assembly, may be circular or rectangular. In the latter case, corner fillets (58) will be required to seal the spaces between the rectangular duct and the circular separator assembly.

FIGS. 11*a*, 11*b*, 11*c* and 11*d* are views of an alternate embodiment of rotational translation of a separator assembly in its first (closed) position, with one moveable separator means (66) arranged for rotational translation about an axis (67) located in any boundary edge of the intake air duct wall (68), said separator means (66) having the axis of rotation parallel to the air flow. In operation, the moveable separator means (66) moves from its first (closed) position to its second (open) position on its axis, rotationally transverse to the direction of the air flow, in either a clockwise or counter-clockwise direction, into the air duct wall.

The power-applying means (18) may be pneumatic, hydraulic, electric or manually-powered actuators, used singly or in combination, mounted in various positions other than those shown.

In each embodiment, the pressure drop across the separating means (10) may be sensed with appropriate means, such as, for example, pressured sensors (22, 23) and a differential pressure switch or controller (24). If a high limit is reached, the actuator(s) (18) may be automatically operated to move the separating means into the open position, simultaneously, separately, or with an appropriate time delay means operating the actuator(s) sequentially.

It will be appreciated that the separating means in any of the embodiments as described in the present application may include vanes only, impactors only, coalescers only, or any combination of impactors, coalescers and vanes. It will be understood that a vane is an internal device which causes a fluid stream, such as an air stream, to change direction, and thereby impart inertial energy to particles contained in the stream as a result of the change in direction. An impactor is a device for separating particles from a stream utilizing the impaction theory, and may, for example, include several layers of knitted mesh material which capture particles entrained in the stream as the stream passes through the impactor. A coalescer is a device which coalesces droplets in a stream to form larger droplets which then drop off the coalescer. By way of example, referring to FIG. 6*a*, all of the stages (21) may be vanes only, coalescers only, or impacters only, or each of the stages (21) may be independently selected from vanes (or any other type of inertial device), impactors and/or coalescers. Thus, one or more of the vanes, impactors and/or coalescers may remain fixed when one or more of the stages move. These various combinations of separating means provide for maximum flexibility in the operation of separating means, and also protect against foreign matter dropping into the engine.

The gasket (13) may be fabricated of any suitable material (e.g., silicone rubber, natural rubber, synthetic rubber, plastics or similar material) that will provide the required sealing surface. The gasket may, if desired, be heated to prevent ice formation and sticking at the seal interface.

Separator assemblies, in accordance with the invention, may be fabricated from any metal, plastics, synthetic or other material or combination of materials having suitable properties.

I claim:

1. A separator assembly for an air duct for normally removing particulate matter entrained in air passing through said air duct, the air being introduced to flow through said air duct in a first direction, said separator assembly comprising:
    separating means for removing particulate matter entrained in the air passing therethrough;
    mounting means for mounting said separating means relative to said air duct so as to be moveable between a first position in which said separating means is arranged so that air passing through said air duct passes through said separating means and a second position in which said separating means is arranged so that air passing through said air duct bypasses said separating means; and
    holding and power-applying means for holding said separating means in said first position and for applying power to said separating means to force said separating means to undergo movement from said first position to said second position, said movement being in a direction which is different from said first direction.

2. A separator assmebly according to claim 1, wherein said power-applying means forces said separating means to move in an opposite direction to said first direction from said first position to said second position.

3. A separator assembly according to claim 1, wherein said power-applying means also constitute said holding means.

4. A separator assembly according to claim 1, wherein said power-applying means are also operable to move said separating means from said second position to said first position.

5. A separator assembly according to claim 1, wherein said mounting means are pivotal mounting means.

6. A separator assembly according to claim 1, wherein said mounting means are such that said separating means moves axially between its first and second positions.

7. A separator assembly according to claim 6, wherein said separating means are carried on tracks extending parallel to said first direction of air flow.

8. A separator assembly according to claim 6 wherein said power-applying means moves said separating means against the power of the air flows from its first position to its second position in a direction opposite to said first direction.

9. A separator assembly according to claim 1, wherein said mounting means are such that said separating means moves horizontally between its first and second positions in a direction transverse to said first direction.

10. A separator assembly according to claim 9, wherein said separating means includes at least one moveable separator member and at least one fixed separator member, said moveable separator member being moveable into said second position adjacent said fixed separator member.

11. A separator assembly according to claim 9, wherein said separating means includes at least one moveable separator which is moveable to said second position through a wall of said air duct.

12. A separator assembly according to claim 1, wherein said mounting means are such that said separating means moves vertically between its first and second positions in a direction transverse to said first direction.

13. A separator assembly according to claim 12, wherein said separating means includes at least one moveable separator member and at least one fixed separator member, said moveable separator member being moveable into said second position adjacent to said fixed separator member.

14. A separator assembly according to claim 12, wherein said separating means includes at least one moveable separator member which is moveable to said second position through a wall in said air duct.

15. A separator assembly according to claim 1, wherein said mounting means are such that said separating means is mounted for rotational movement between its first and second positions in a direction transverse to said first direction.

16. A separator assembly according to claim 15, wherein said separating means is mounted for said rotational movement on an axis located centrally in said duct and extending in a direction parallel to said first direction.

17. A separator assembly according to claim 15, wherein said separating means is mounted on wheel frame means for moving said separating means between its first and second positions.

18. A separator assembly according to claim 17, wherein said separating means are mounted in first and second rotatable wheel frames as equi-angularly disposed separator sectors, said separator sectors defining in its wheel frame an equal number of open sectors between said separator sectors, said first and second wheel frames being rotatable relative to each other transverse to said first direction to move said separator sectors between a first position in which said separator sectors in one wheel frame are axially aligned with the open sectors in the other wheel frame to form a complete circular separating means, and a second position in which said separating sectors in each wheel are axially aligned with each other to expose said open sectors so that air passing through said duct bypasses said separator sectors.

19. A separator assembly according to claim 15, wherein said separating means is mounted for said rotational movement on an axis located adjacent a perimeter of of said air duct and extending parallel to said first direction.

20. A separator assembly according to claim 1, wherein the arrangement is such that substantially all of the air passing through said air duct normally passes through said separating means.

21. A separator assembly according to claim 1, and including at least one further separating means.

22. A separator assembly according to claim 21, wherein said at least one further separating means is movable simultaneously with said separating means.

23. A separator assembly according to claim 21, wherein said at least one further separating means is moveable independently of said separating means.

24. A separator assembly according to claim 21, wherein one of said separating means and said at least one further separating means is movable while the other remains stationary.

25. A separator assembly according to claim 21, wherein said separating means moves when a first predetermined pressure drop exists across said separating means so that air passing through said duct bypasses said separating means, and said at least one further separating means moves when a second predetermined pressure drop exists across said at least one further separating means so that air passing through said duct bypasses said at least one further separating means.

26. A separator assembly according to claim 21, wherein at least one of said separating means and said at least one further separating means includes moveable separating members.

27. A separator assembly according to claim 26, wherein said separating members are moveable simultaneously with each other.

28. A separator assembly according to claim 26, wherein said separating members are movable independently of each other.

29. A separator assembly according to claim 26, wherein a first separating member moves and a second separating member remains stationary when a first pressure drop exists across said first separating means so that air passing through said duct bypasses said first separating member, and said second separating member moves when a second predetermined pressure drop exists across said second separating member so that air passing through said duct bypasses said second separating member.

30. A separator assembly according to claim 21, wherein said separating means and said at least one further separating means are disposed in a common plane in said duct.

31. A separator assembly according to claim 21, wherein said separating means and said at least one further separating means are disposed in parallel planes in said duct.

32. A separator assembly according to claim 21, wherein said further separating means operates in parallel with said separating means, the arrangement being such that substantially all of the air passing through said air duct passes through said separating means and said further separating means.

33. A separator assembly according to claim 32, wherein means are provided for applying power other than that of the air flow said further separating means to force said further separating means to move in said first direction from its first position to its second position and in the reverse direction from its second position to its first position.

34. A separator assembly according to claim 1, wherein said separating means includes at least two separating members.

35. A separator assembly according to claim 34, wherein said separating members are moveable simultaneously with each other.

36. A separator assembly according to claim 34, wherein said separating members are moveable independently of each other.

37. A separator assembly according to claim 34, wherein a first separating member moves and a second separating member remains stationary when a first pressure drop exists across said first separating member so that air passing through said duct bypasses said first separating member, and said second separating member moves when a second predetermined pressure drop exists across said second separating member so that air passing through said duct bypasses said second separating member.

38. A separator assembly according to claim 34, wherein said separating members are moveable in said first direction.

39. A separator assembly according to claim 34, wherein said separating members are moveable against said first direction.

40. A separator assembly according to claim 34, wherein one of said separating members is moveable in said first direction and another of said separating member is moveable against said first direction.

41. A separator assembly according to claim 34, wherein one of said separating members moves in said first direction while another separating member remains stationary.

42. A separator assembly according to claim 34, wherein one of said separating members moves against said first direction while another separating member remains stationary.

43. A separator assembly according to claim 34, wherein said separating members are mounted for pivotal movement from a first open position to a second closed position about an axis extending transverse to said first direction.

44. A separator assembly according to claim 43, wherein said separating members are mounted for pivotal movement about an axis on a boundary surface.

45. A separator assembly according to claim 1, wherein said separating means or each separating means is supported in a frame by which it is mounted.

46. A separator assembly according to claim 1, wherein sensing means are provided for sensing a pressure differential of air across said separating means.

47. A separator assembly according to claim 46, wherein said holding and power-applying are operatively connected to said sensing means so that said holding and power-applying means are responsive to said sensing means sensing a pressure differential greater than a predetermined pressure difference to cause said movement of said separating means from its first position to its second position.

48. A separator assembly according to claim 47, wherein said power-applying means includes a manually powered actuator and said sensing means is arranged to provide a visible and/or audible signal to an operator when the sensing means senses a pressure differential greater than a predetermined pressure difference.

49. A separator assembly according to claim 1, wherein said separating means includes one or more vanes.

50. A separator assembly according to claim 1, wherein said separating means includes one or more impactors.

51. A separator assembly according to claim 1, wherein said separating means includes one or more coalescers.

52. A separating means according to claim 1, wherein said separating means comprises one or more of a vane, an impactor and/or a coalescer.

53. A separator assembly according to claim 52, wherein one or more of said vane, impactor and/or coalescer is fixed, and one or more of said vane, impactor and/or coalescer is moveable.

54. A separator assembly according to claim 1 wherein said separating means protects against the ingress of foreign bodies and ice into an engine.

55. A separating assembly according to claim 54 wherein said foreign bodies are bolts and broken machine parts.

* * * * *